US010193195B2

(12) United States Patent
Morita et al.

(10) Patent No.: US 10,193,195 B2
(45) Date of Patent: Jan. 29, 2019

(54) CHARGING CONDITION CONTROL APPARATUS AND BATTERY PACK

(71) Applicant: Kabushiki Kaisha Toshiba, Minato-ku (JP)

(72) Inventors: Tomokazu Morita, Funabashi (JP); Takashi Kuboki, Tokyo (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 87 days.

(21) Appl. No.: 15/260,614

(22) Filed: Sep. 9, 2016

(65) Prior Publication Data
US 2017/0069938 A1 Mar. 9, 2017

(30) Foreign Application Priority Data
Sep. 9, 2015 (JP) ................ 2015-177754

(51) Int. Cl.
H02J 7/00 (2006.01)
H01M 10/44 (2006.01)
H01M 10/46 (2006.01)
H01M 10/48 (2006.01)
H01M 10/0525 (2010.01)
H01M 4/38 (2006.01)
H01M 4/587 (2010.01)

(52) U.S. Cl.
CPC ....... H01M 10/448 (2013.01); H01M 10/446 (2013.01); H01M 10/46 (2013.01); H01M 10/48 (2013.01); H02J 7/007 (2013.01); H02J 7/0021 (2013.01); H01M 4/386 (2013.01); H01M 4/587 (2013.01); H01M 10/0525 (2013.01)

(58) Field of Classification Search
CPC ..... Y02E 60/12; H01M 2/1055; H01M 10/46; H01M 10/425; H02J 7/0045
USPC .......................................... 320/112
See application file for complete search history.

(56) References Cited

U.S. PATENT DOCUMENTS

2008/0094031 A1* 4/2008 Singh ................ G01R 31/3634
320/132
2009/0112496 A1 4/2009 Suzuki
2013/0069598 A1 3/2013 Tanaka et al.

FOREIGN PATENT DOCUMENTS

JP 2004-222427 A 8/2004
JP 2009-112113 A 5/2009
JP 2010-57325 A 3/2010
JP 2013-65481 A 4/2013
JP 2013-187960 A 9/2013
(Continued)

Primary Examiner — Arun C Williams
(74) Attorney, Agent, or Firm — Oblon, McClelland, Maier & Neustadt, L.L.P.

(57) ABSTRACT

According to an embodiment, a charging condition control apparatus includes a measurement unit, an estimation unit, a calculation unit and a control unit. The measurement unit measures a present battery capacity of a secondary battery. The estimation unit estimates a present end-of-charge potential of an anode of the secondary battery based on the present battery capacity and an open circuit potential curve of the anode. The calculation unit calculates a differential potential between the present end-of-charge potential and an initial end-of-charge potential of the anode. The control unit controls a charging condition of the secondary battery according to the differential potential.

4 Claims, 5 Drawing Sheets

(56) References Cited

FOREIGN PATENT DOCUMENTS

WO     WO 2013/133017 A1     9/2013

\* cited by examiner

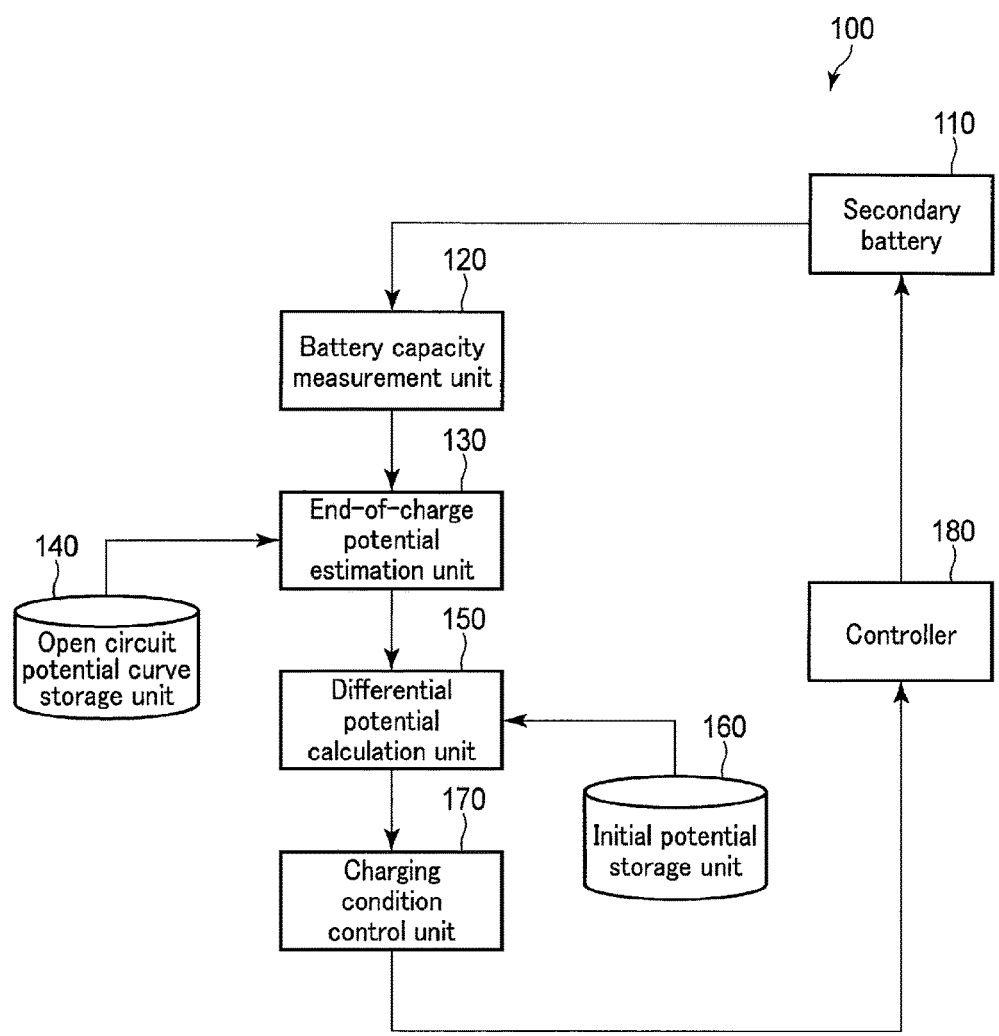
F I G. 1

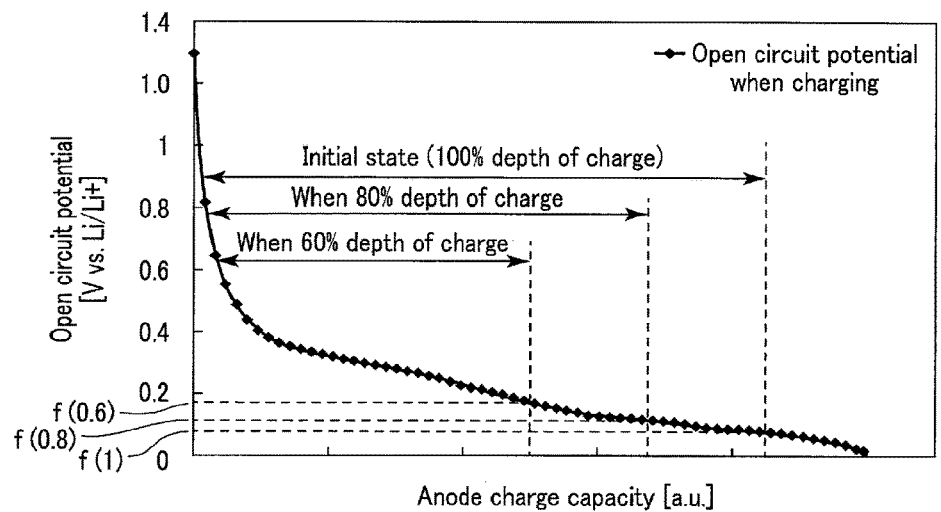
F I G. 7
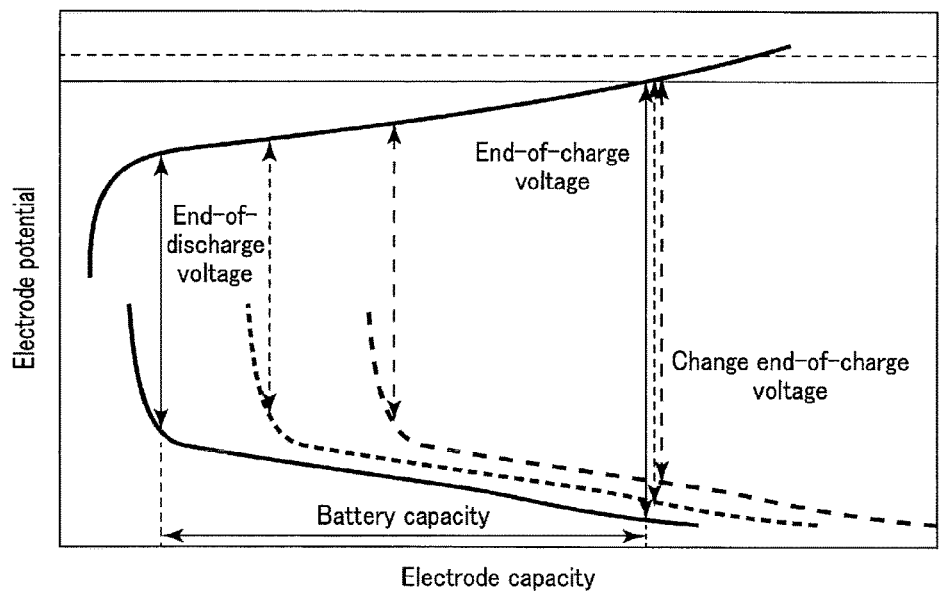
F I G. 8

CHARGING CONDITION CONTROL APPARATUS AND BATTERY PACK

CROSS-REFERENCE TO RELATED APPLICATIONS

This application is based upon and claims the benefit of priority from Japanese Patent Application No. 2015-177754, filed Sep. 9, 2015, the entire contents of which are incorporated herein by reference.

FIELD

Embodiments relate to the control of charging conditions of secondary batteries.

BACKGROUND

Nonaqueous electrolyte secondary batteries such as lithium ion secondary batteries are known to have a high energy density. Owing to this, nonaqueous electrolyte secondary batteries have been typically used as power sources for portable electronic equipment. Moreover, applications of nonaqueous electrolyte secondary batteries have recently been expanded to the energy sources for hybrid transport equipment (e.g., hybrid cars, hybrid bicycles) or electromotive transport equipment (e.g., electric vehicles, electric motorcycles).

Additionally, use of nonaqueous electrolyte secondary batteries as batteries for large-scale power storage is also being fully studied.

Still, the energy density of the nonaqueous electrolyte secondary batteries currently in practical use is, when evaluated in terms of, e.g., maximum continuous Internet connection time of smartphones or maximum travel distance per one charge of electric vehicles, not considered to be sufficiently high to meet such needs. As such, research and development for improving the energy density of nonaqueous electrolyte secondary batteries are being conducted. More concretely, as the improvement in a capacity density of active materials may lead to a drastic improvement in the energy density of nonaqueous electrolyte secondary batteries, attempts are being made to apply various materials to cathode active materials and anode active materials.

For example, graphite, carbon-based materials and lithium titanium oxide (LTO) are known as anode active materials. Further, silicon (Si) has a greater capacity than these anode active materials and the capacity of Si alone is about 10 times that of graphite. The Li absorption mechanism of Si as an anode active material corresponds to an alloying reaction to form Li—Si alloy, and involves a very large volume change. Thus, use of Si alone as an anode material will accelerate size reduction of the active material particles and collapse of the electrode due to the volume change at the time of charge and discharge of the battery, resulting in early deterioration of the battery capacity. Accordingly, in using Si as an anode material, the influence of the volume change is suppressed typically by altering Si into SiO through partial oxidation, by adopting Si in the form of composite active material particles such as a coating, by compounding Si with a carbon-based material within electrode active material layers, or the like.

Use of such composite Si may realize a lithium ion secondary battery having a practical level of cycle life as well as a large energy density. Nevertheless, batteries employing composite Si as an anode involve a large volume change of Si, which easily causes a break of an electrode (mode concretely, anode) and particles and the side-reactions due to increase of their surface areas, as compared to the conventional batteries employing graphite as an anode material. As such, in the batteries employing composite Si as an anode, deteriorating reactions of the anode (specifically, capacity decrease of the anode and a reaction to consume Li stored in the anode) progress more rapidly than in the conventional batteries employing graphite as an anode material.

Moreover, if a cathode hardly deteriorates while the deteriorating reactions of an anode rapidly progress, the capacity ratio between the cathode and the anode, as well as the SOC (State Of Charge) position will change. Charging the battery having such a changed internal state under the same conditions as prior to the change (e.g., at the start of use) would promote the deterioration of the battery capacity.

More concretely, where a charge and discharge potential curve shows a gentle gradient as with the anode using graphite or LTO, even a change in the SOC position of the anode will not largely influence the deteriorating speed of the battery capacity. On the other hand, when a battery combines an anode providing a charge and discharge potential curve of a steep gradient (e.g., Si that is compounded or mixed with a carbon material) and a cathode having a capacity in the high potential region, a shift of the SOC position of the anode will largely change the end-of-charge potential of the cathode, resulting in the cathode being charged in the high potential region that is not normally used as a charge and discharge capacity and therefore in fast deterioration.

BRIEF DESCRIPTION OF THE DRAWINGS

FIG. 1 is a block diagram showing an example of the battery pack according to a first embodiment.

FIG. 7 illustrates the estimate processing by the end-of-charge potential estimation unit in FIG. 1.

FIG. 8 illustrates the control of an end-of-charge voltage by the charging condition control unit in FIG. 1.

DETAILED DESCRIPTION

Figure 2:
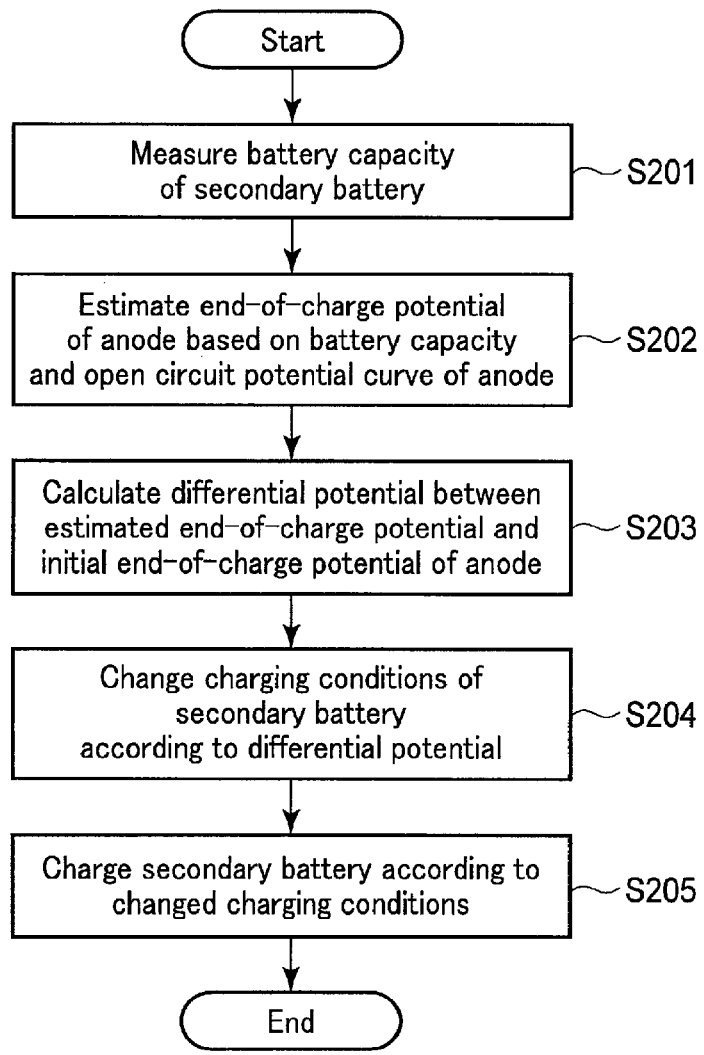
FIG. 2 is a flowchart showing an example of the operations of the battery pack of FIG. 1.

Hereinafter, embodiments will be described with reference to the drawings.

According to an embodiment, a charging condition control apparatus includes a measurement unit, an estimation unit, a calculation unit and a control unit. The measurement unit measures a present battery capacity of a secondary battery. The estimation unit estimates a present end-of-charge potential of an anode of the secondary battery based on the present battery capacity and an open circuit potential curve of the anode. The calculation unit calculates a differential potential between the present end-of-charge potential and an initial end-of-charge potential of the anode. The control unit controls a charging condition of the secondary battery according to the differential potential.

According to another embodiment, a battery pack includes a secondary battery, a measurement unit, an estimation unit, a calculation unit, a control unit and a charger. The secondary battery includes a cathode and an anode. The measurement unit measures a present battery capacity of the secondary battery. The estimation unit estimates a present end-of-charge potential of the anode based on the present battery capacity and an open circuit potential curve of the anode. The calculation unit calculates a differential potential between the present end-of-charge potential and an initial end-of-charge potential of the anode. The control unit controls a charging condition of the secondary battery according to the differential potential. The charger charges the secondary battery according to the charging condition.

Hereinafter, the same or similar elements to once described elements will be denoted by the same reference symbols, and redundant descriptions will basically be omitted.

(First Embodiment)

As illustrated by FIG. 1, a battery pack 100 according to the first embodiment comprises a secondary battery 110, a battery capacity measurement unit 120, an end-of-charge potential estimation unit 130, an open circuit potential curve storage unit 140, a differential potential calculation unit 150, an initial potential storage unit 160, a charging condition control unit 170, and a controller 180.

Some of the elements in the battery pack 100 (e.g., the battery capacity measurement unit 120, the end-of-charge potential estimation unit 130, the open circuit potential curve storage unit 140, the differential potential calculation unit 150, the initial potential storage unit 160, and the charging condition control unit 170) may constitute a charging condition control apparatus.

The secondary battery 110 may correspond to a single cell or to an assembled battery having a plurality of cells connected in series or in parallel. Each of the cells may correspond to a nonaqueous electrolyte secondary battery such as a lithium ion secondary battery.

The cathode of the secondary battery 110 may be formed with, for example, a layered cathode material such as lithium cobalt oxide, lithium nickel oxide, and a ternary material. Such a layered cathode material has a capacity capable of charging and discharging in the high potential region, in addition to a capacity that is normally used as a charge and discharge capacity. Yet, charge and discharge in the high potential region would rapidly deteriorate the cathode due to the destruction of its crystalline structure or the side-reactions with an electrolyte.

The anode of the secondary battery 110 may contain, for example, Si and a carbon-based material that absorb lithium.

The anode of the secondary battery 110 may be formed with a silicon-containing oxide, e.g., $SiO_x$ (0≤x≤2), or with a material comprising $SiO_x$ compounded with at least one of carbon materials and ceramic materials.

Figure 3:
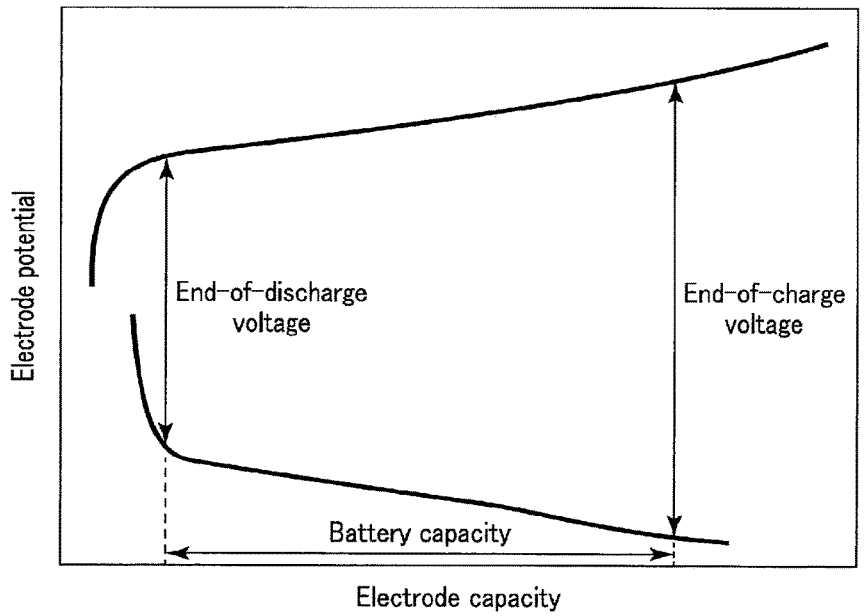
FIG. 3 is a graph showing an example of the potential curves of a cathode and an anode.

FIG. 3 shows the relationship between capacity and potential for each of the cathode and the anode of the secondary battery 110. The secondary battery 110 is charged by the controller 180 in, for example, a constant current-constant voltage mode. The controller 180 may be referred to as a charger. In the constant current-constant voltage mode, the secondary battery 110 is charged with a constant current until the potential difference between the cathode and the anode reaches a predetermined end-of-charge voltage, and then charged with a constant voltage. Note that the secondary battery 110 may also be charged in a constant power-constant voltage mode or other modes by the controller 180.

Figure 4:
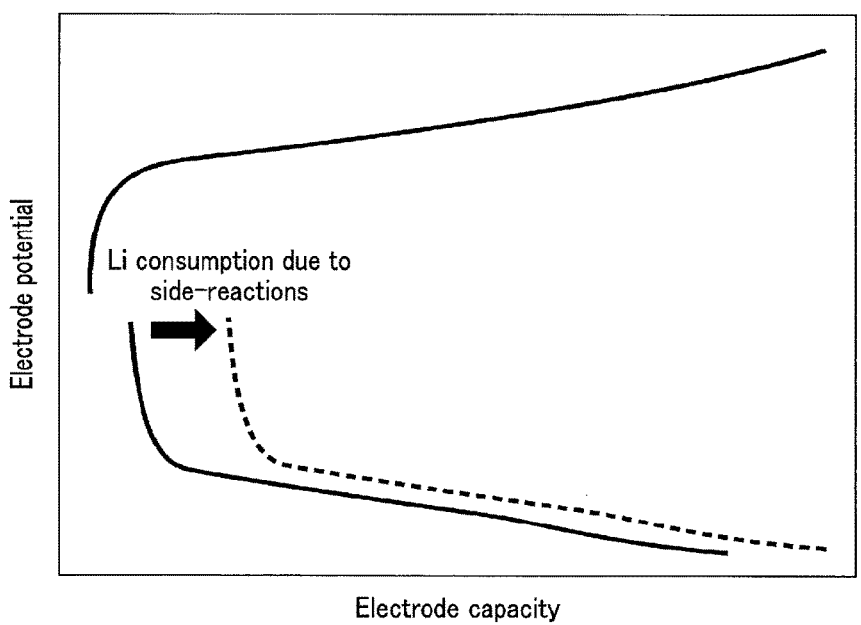
FIG. 4 illustrates the change in the internal state of an anode.
Figure 5:
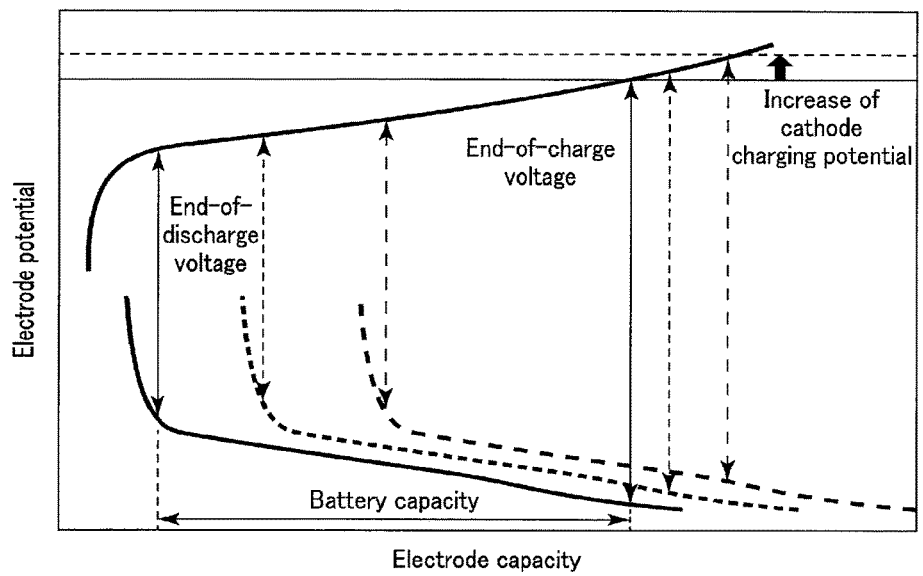
FIG. 5 illustrates the phenomenon where the end-of-charge potential of a cathode increases in conjunction with the change in the internal state of an anode.

It is often the case when an anode is formed of a graphite material or an alloy-based material using Si, tin (Sn), or the like that a break occurs in the active material particles or the electrode active material layer in conjunction with the expansion and contraction of the anode and causes surface side-reactions. If the stored Li is consumed by the surface side-reactions, the SOC position of the anode will shift according to the consumption amount as illustrated in FIG. 4. As a result, the depth of charge of the anode becomes small in the fully charged state of the secondary battery 110. In other words, as illustrated in FIG. 5, the potentials of the cathode and the anode at the point when the potential difference between the cathode and the anode reaches the end-of-charge voltage will rise in conjunction with the shift of the SOC position of the anode. As such, where the shift of the SOC position of the anode progresses, the cathode would be charged and discharged in the high potential region to rapidly deteriorate.

Accordingly, the battery pack 100 is adapted to change the charging conditions of the secondary battery 110 (e.g., decreasing the end-of-charge voltage) according to the internal state of the anode, thereby preventing the cathode from being charged and discharged in the high potential region to rapidly deteriorate, and consequently achieving the prolonged life (extension of life) of the secondary battery 110.

The battery capacity measurement unit 120 measures the (present) battery capacity of the secondary battery 110. The battery capacity may be measured through various techniques. For example, for measuring the battery capacity, the battery capacity measurement unit 120 may have the secondary battery 110 charged and discharged via the controller 180 and integrate the values of the current flowing through the secondary battery 110 to thereby estimate the battery capacity. The battery capacity measurement unit 120 outputs a signal or data indicative of the measured battery capacity (Q) to the end-of-charge potential estimation unit 130.

The end-of-charge potential estimation unit 130 receives the signal or data indicative of the battery capacity (Q) from the battery capacity measurement unit 120. The end-of-charge potential estimation unit 130 calculates the decrease amount (ΔQ) of the battery capacity by subtracting the battery capacity (Q) from the initial battery capacity ($Q_0$), as shown by below formula (1). Note that the initial battery capacity ($Q_0$) may be a design value of the battery capacity of the secondary battery 110 or may be obtained through actual measurement.

$$\Delta Q = Q_0 - Q \quad (1)$$

Assuming that the main cause of the decrease of the battery capacity is Li consumption due to the side-reactions at the anode, and supposing that the depth of charge ($X_{charge}$) of the anode is 1 in the fully charged state of the secondary battery 110 at the initial stage (e.g., at the start of use), the depth of charge ($X_{charge}$) of the anode in the fully charged state of the secondary battery 110 at the measurement of the battery capacity (Q) may be estimated by below formula (2).

$$X_{charge} = \frac{Q_0 - \Delta Q}{Q_0} \quad (2)$$

Further, the end-of-charge potential estimation unit 130 refers to the open circuit potential curve of the anode, stored in the open circuit potential curve storage unit 140. By referring to this open circuit potential curve, the end-ofcharge potential estimation unit 130 may estimate the anode potential (i.e., end-of-charge potential) in the fully charged state of the secondary battery 110 at the measurement of the battery capacity (Q) as illustrated in FIG. 7. More concretely, if this open circuit potential curve is expressed as a function f(X) that returns an open circuit potential (E) corresponding to the depth of charge (X), the end-of-charge potential ($E_{anode}$) of the anode at the measurement of the battery capacity (Q) conforms to $f(X_{charge})$. Note that the end-of-charge potential ($E_{anode\_0}$) when the secondary battery 110 is at the initial stage, which anode potential may also be called an initial potential ($E_{anode\_0}$), conforms to f(1).

The end-of-charge potential estimation unit 130 outputs a signal or data indicative of the end-of-charge potential ($E_{anode}$) of the anode at the measurement of the battery capacity (Q) to the differential potential calculation unit 150.

Figure 6:
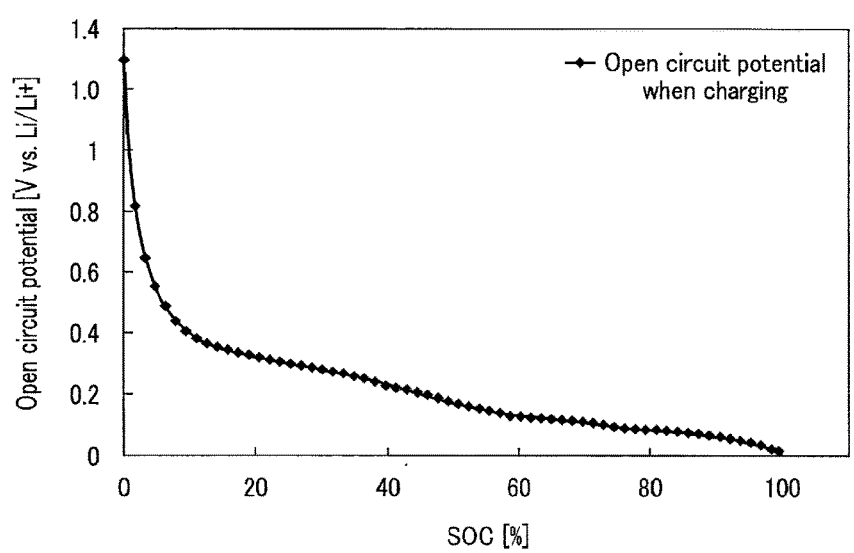
FIG. 6 is a graph showing an example of the open circuit potential curve of an anode.

The open circuit potential curve at the charge or discharge of the anode of the secondary battery 110, as illustrated in FIG. 6, is stored in the open circuit potential curve storage unit 140. The open circuit potential curve may be stored in the form of a function or a look-up table. The open circuit potential curve stored in the open circuit potential curve storage unit 140 is referred to by the end-of-charge potential estimation unit 130 as needed.

The differential potential calculation unit 150 receives the end-of-charge potential ($E_{anode}$) of the anode at the measurement of the battery capacity (Q) from the end-of-charge potential estimation unit 130 and reads the initial potential ($E_{anode\_0}$) from the initial potential storage unit 160. Then the differential potential calculation unit 150 calculates a differential potential ($\Delta E$) of the $E_{anode}$ with respect to the $E_{anode\_0}$ as given by below formula (3).

$$\Delta E = E_{anode} - E_{anode\_0} \quad (3)$$

That is, the differential potential calculation unit 150 estimates the increase amount of the end-of-charge potential of the anode, caused by the Li consumption due to the side-reactions at the anode. The differential potential calculation unit 150 outputs a signal or data indicative of the differential potential ($\Delta E$) to the charging condition control unit 170.

The initial potential ($E_{anode\_0}$) is stored in the initial potential storage unit 160. The initial potential ($E_{anode\_0}$) stored in the initial potential storage unit 160 is read by the differential potential calculation unit 150 as needed.

The charging condition control unit 170 receives the signal or data indicative of the differential potential ($\Delta E$) from the differential potential calculation unit 150. The charging condition control unit 170 controls the charging conditions of the secondary battery 110 according to the differential potential ($\Delta E$). More concretely, the charging condition control unit 170 derives the end-of-charge voltage ($E_{cell}$) of the secondary battery 110 by subtracting the differential potential ($\Delta E$) from the initial end-of-charge voltage ($E_{cell\_0}$) of the secondary battery 110, as given by below formula (4).

$$E_{cell} = E_{cell\_0} - \Delta E \quad (4)$$

The charging condition control unit 170 outputs a signal or data indicative of the end-of-charge voltage ($E_{cell}$) of the secondary battery 110 to the controller 180. With the charging condition control unit 170 controlling the charging conditions (end-of-charge voltage) in this manner, the end-of-charge potential of the cathode is maintained within a substantially constant range and thus will not transition to the high potential region, irrespective of the size of the shift of the SOC position as illustrated in FIG. 8. Therefore, such control of the charging conditions may prolong the life of the secondary battery 110.

The controller 180 receives the signal or data indicative of the end-of-charge voltage ($E_{cell}$) from the charging condition control unit 170 and charges the secondary battery 110 according to this end-of-charge voltage ($E_{cell}$). The charging mode of the secondary battery 110 may be a constant current-constant voltage mode, a constant power-constant voltage mode, or other modes as discussed above.

The battery pack 100 operates as illustrated by FIG. 2.

First, the battery capacity measurement unit 120 measures the (present) battery capacity of the secondary battery 110 (step S201).

Based on the battery capacity measured at step S201 and the open circuit potential curve of the anode of the secondary battery 110 which is stored in the open circuit potential curve storage unit 140, the end-of-charge potential estimation unit 130 estimates the (present) end-of-charge potential of the anode (step S202). For example, the end-of-charge potential estimation unit 130 may estimate the end-of-charge potential by calculating the depth of charge of the anode in the fully charged state of the secondary battery 110 based on the initial battery capacity and the present battery capacity of the secondary battery 110, and retrieving the potential corresponding to this depth of charge from the open circuit potential curve.

The differential potential calculation unit 150 calculates the differential potential between the end-of-charge potential estimated at step S202 and the initial potential stored in the initial potential storage unit 160 (step S203).

According to the differential potential calculated at step S203, the charging condition control unit 170 controls (changes) the charging conditions of the secondary battery 110 (step S204). For example, the charging condition control unit 170 may derive the (changed) end-of-charge voltage of the secondary battery 110 by subtracting the differential potential from the initial end-of-charge voltage of the secondary battery 110.

According to the charging conditions changed at step S204, the controller 180 charges the secondary battery 110 (step S205).

As has been described, a battery pack according to the first embodiment estimates the present end-of-charge potential of an anode based on the present battery capacity of a secondary battery and the open circuit potential curve of the anode, and calculates the differential potential (increase amount) from the initial end-of-charge potential. The battery pack then controls, according to the differential potential, the charging conditions to keep the end-of-charge potential of a cathode from transitioning to a high potential region. As such, with this battery pack, the charging conditions are appropriately controlled and a prolonged life of the secondary battery may be attained. Additionally, where the process of deteriorating is complex, it is generally not easy to accurately quantify the internal state of a secondary battery including a composite anode; nonetheless, this battery pack enables simple estimation of the present end-of-charge potential of the anode.

Incidentally, this embodiment has been assuming that the main cause of the decrease of a battery capacity is Li consumption due to the side-reactions at an anode. Still, in practice, when an anode containing Si is deteriorated, not only the SOC position shifts but also the anode capacity decreases. As such, the end-of-charge potential of an anode estimated according to the embodiment would not always coincide with an actual end-of-charge potential. Meanwhile, the end-of-charge potential where the anode capacity has decreased is lower than the end-of-charge potential of the anode estimated according to the embodiment. Therefore, decreasing the end-of-charge voltage based on the embodiment will yield an actual end-of-charge potential of a cathode that is further lower than the estimated end-of-charge potential, and the cathode may be charged and discharged in a further safer state. Naturally, the estimate error of the end-of-charge potential of an anode will not damage the effect of the embodiment.

Various functional units having been described in the embodiments may be realized using circuits. The circuits may be circuits of exclusive use for specific functions, or may be circuits of general use such as a processor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A charging condition control apparatus, comprising:
a measurement unit configured to measure a present battery capacity of a secondary battery;
an estimation unit configured to estimate a present end-of-charge potential of an anode of the secondary battery based on the present battery capacity and an open circuit potential curve of the anode;
a calculation unit configured to calculate a differential potential between the present end-of-charge potential and an initial end-of-charge potential of the anode; and
a control unit configured to control a charging condition of the secondary battery according to the differential potential,
wherein the estimation unit estimates the present end-of-charge potential by calculating a depth of charge of the anode based on the present battery capacity and an initial battery capacity and by retrieving a potential corresponding to the depth of charge from the open circuit potential curve.

2. The apparatus according to claim 1, wherein the control unit derives an end-of-charge voltage of the secondary battery by subtracting the differential potential from an initial end-of-charge voltage of the secondary battery.

3. A battery pack, comprising:
a secondary battery that comprises a cathode and an anode;
a measurement unit configured to measure a present battery capacity of the secondary battery;
an estimation unit configured to estimate a present end-of-charge potential of the anode based on the present battery capacity and an open circuit potential curve of the anode;
a calculation unit configured to calculate a differential potential between the present end-of-charge potential and an initial end-of-charge potential of the anode;
a control unit configured to control a charging condition of the secondary battery according to the differential potential; and
a charger that charges the secondary battery according to the charging condition,
wherein the estimation unit estimates the present end-of-charge potential by calculating a depth of charge of the anode based on the present battery capacity and an initial battery capacity and by retrieving a potential corresponding to the depth of charge from the open circuit potential curve.

4. The battery pack according to claim 3, wherein the anode comprises silicon and a carbon-based material that absorb lithium.

* * * * *